Nov. 30, 1926.

J B. SMITH 1,608,679

AUTOMOBILE GLARESHIELD

Filed June 13, 1925

INVENTOR.
J. BERNICE SMITH.
BY
ATTORNEY.

Patented Nov. 30, 1926.

1,608,679

UNITED STATES PATENT OFFICE.

J BERNICE SMITH, OF LONG BEACH, CALIFORNIA.

AUTOMOBILE GLARESHIELD.

Application filed June 13, 1925. Serial No. 36,793.

This invention relates to that type of glare shield which may be readily attached to the frame of wind shield, and adjusted to eliminate the glare of the road or approaching head lights.

An object of my invention is to provide a shield which may be mounted on the wind shield frame without the use of bolts, screws etc.

Another object is to provide a shield which may readily be adjusted either angularly or laterally with minimum effort.

Further objects are to provide a shield which is simple in construction and inexpensive to manufacture.

Other objects, advantages and features of invention may appear from the accompanying drawing the subjoined detailed description and the appended claims.

In the drawing illustrating my invention.

Figure 1:
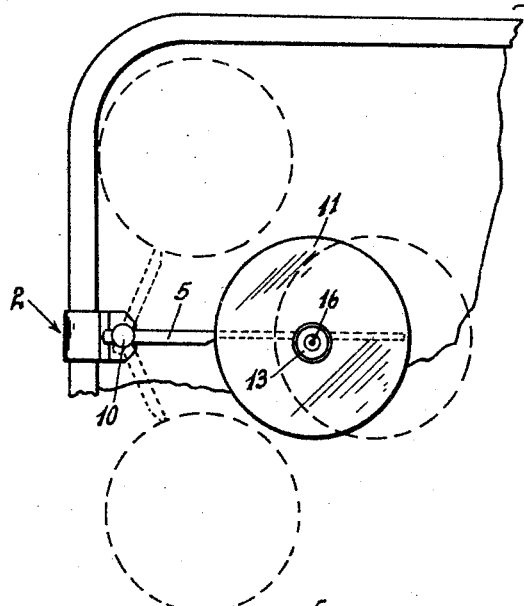
Fig. 1 is a front elevation of my shield in position on a wind shield.
Figure 2:
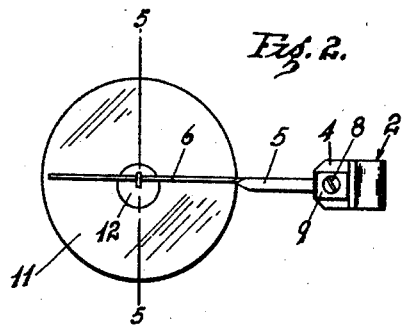
Fig. 2 is a rear elevation of the glare shield.
Figure 3:
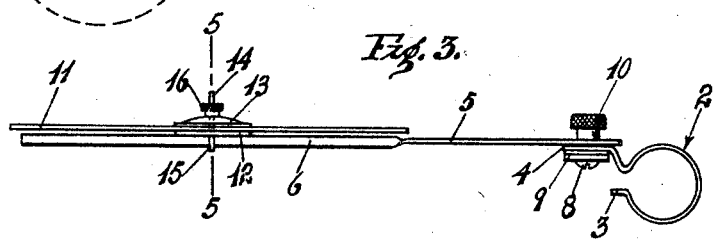
Fig. 3 is an enlarged plan view of the same.
Figure 4:
Fig. 4 is a side elevation of the supporting arm.
Figure 5:
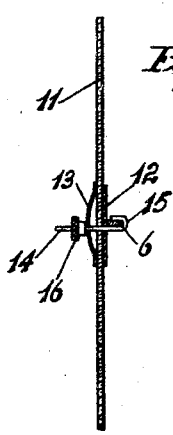
Fig. 5 is a sectional view taken on line 5—5, Figs. 2 or 3.
Figure 6:
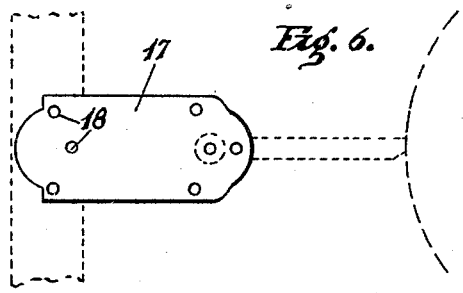
Fig. 6 is a front elevation of a modified form of mounting.

Referring more particularly to the drawing:

My glare shield is supported on the wind shield frame 1, by means of a spring clamp 2 encircling said frame. This clamp is provided with a lip 3 at one side thereof, and with an integral supporting plate 4 at the other side thereof. The lip 3 facilitates the mounting of the clamp about the frame 1, and an arm 5 is pivotally mounted on the plate 4.

The flat arm 5 is formed with 90° twist so that the outer end 6 thereof is disposed at right angles to the base. A hole 7 is formed thru the base of the arm and a bolt 8 extends thru a back washer 9, the plate 4, and hole 7, and a thumb nut 10 of any desired type screws on the bolt to hold the arm 5 in any desired angular position, as shown in dotted lines Fig. 1.

A translucent disc 11 is slidably mounted on the end 6, and is preferably formed of a cellulose composition or the like.

A washer 12 is positioned back of said disc, and another washer 13 is positioned on the front thereof. A pin 14 extends through the washer 12, 13 and disc 11; and is formed with a hook 15 on the end thereof, which extends over the end 6. The pin is threaded to receive a thumb nut 16 which nut bears against the washer 13 and thus clamps the end 6 against the washer 12 to hold the disc 11 in any desired longitudinal adjusted position.

My shield is particularly applicable for night driving to eliminate the glare of approaching head lights. The shield is so adjusted that the driver does not look thru the disc 11, but the disc is positioned to the left, out of the line of vision, to obstruct the glaring head light rays. When not in use the disc 11 may be swung upwardly or downwardly out of the way.

For closed vehicles a plate 17 is employed which has holes 18 formed therein through which screws extend into the wind shield frame. The arm 5 is pivotally mounted to the end of the plate 17 as previously described.

I claim:

1. A glare shield comprising a spring clamp adapted to encircle the wind shield frame, a plate integrally formed on said clamp, a flat arm, a bolt extending through said plate and arm, a thumb nut screwed on said bolt, and a translucent disc mounted on said arm, said arm being formed with a twist to form an end disposed at right angles to said arm, said disc being mounted on said end, and means slidably securing the disc to the end.

2. A glare shield comprising a spring clamp adapted to encircle the wind shield frame, a plate formed on said clamp, a flat arm, a bolt extending through said plate and arm, a thumb nut screwed on said bolt, and a translucent disc mounted on said arm, said arm being formed with a twist to form an end disposed at right angles to said arm, said disc being mounted on said end, a pin extending thru said disc, a hook on said pin engaging said arm end and a thumb nut screwed on said pin.

In testimony whereof I this day set my hand and seal.

J BERNICE SMITH.